April 17, 1934.   W. H. ROBERTSON ET AL   1,955,148
ENGINE WITH AN OSCILLATING BLADE OR BLADES FOR THE DEVELOPMENT OF POWER
Filed June 21, 1929   3 Sheets-Sheet 2
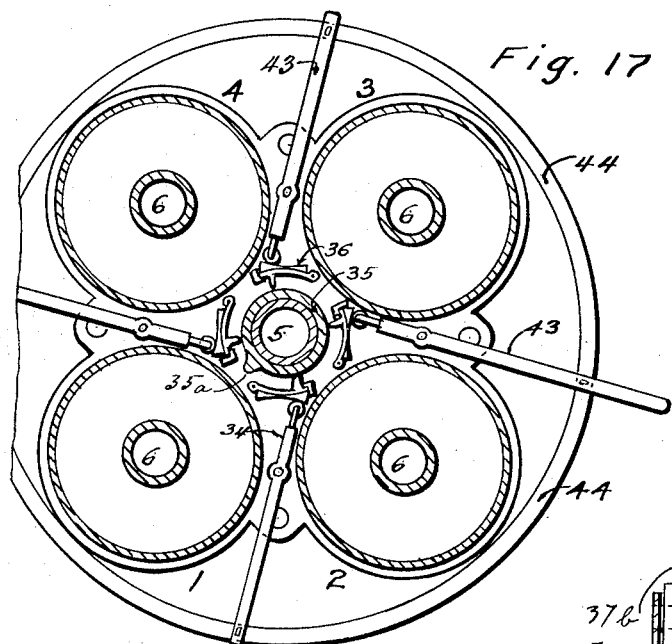
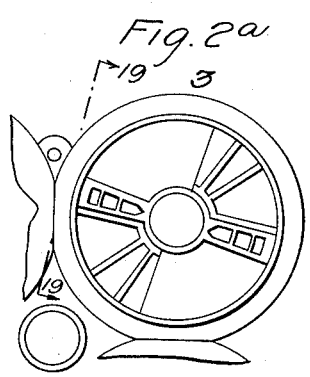
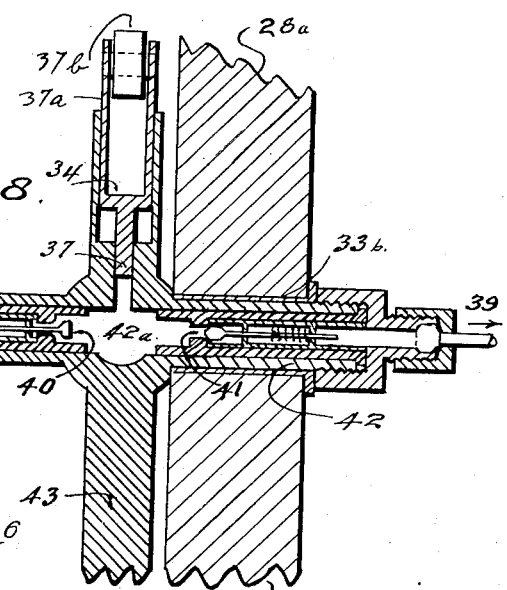
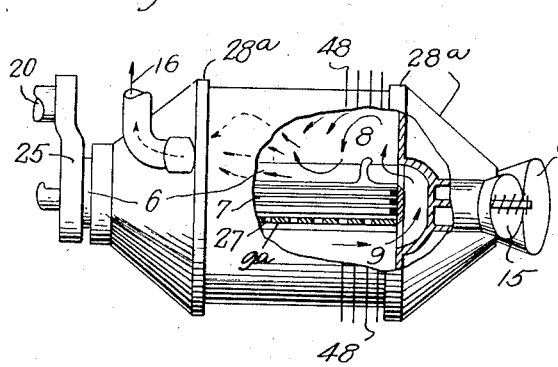
William H. Robertson and John H. Lewis.
Joint Inventors.
John H. Lewis,
Attorney.

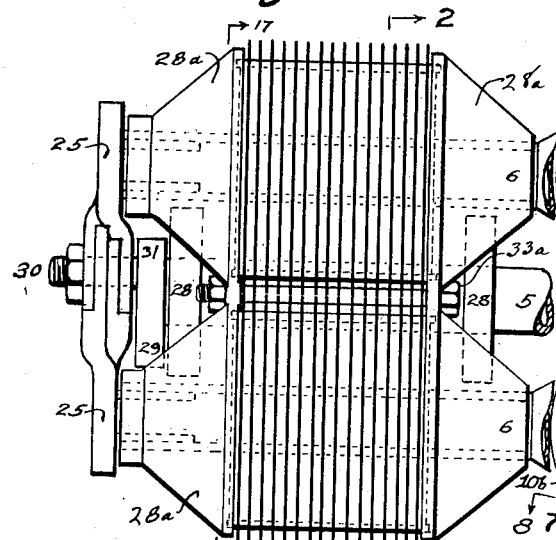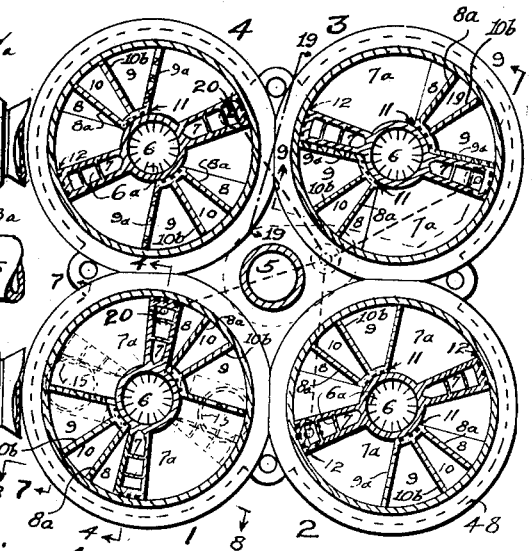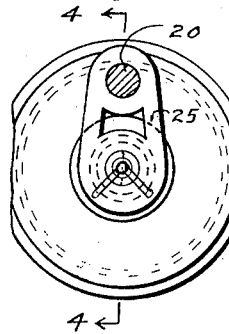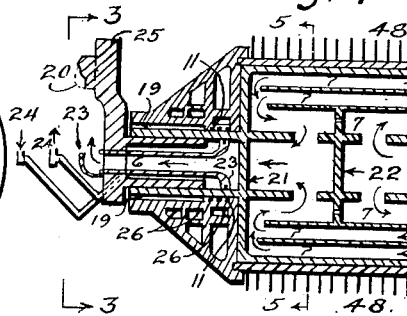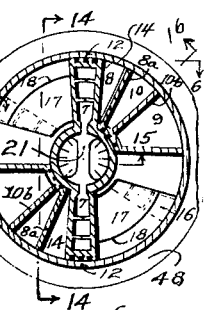

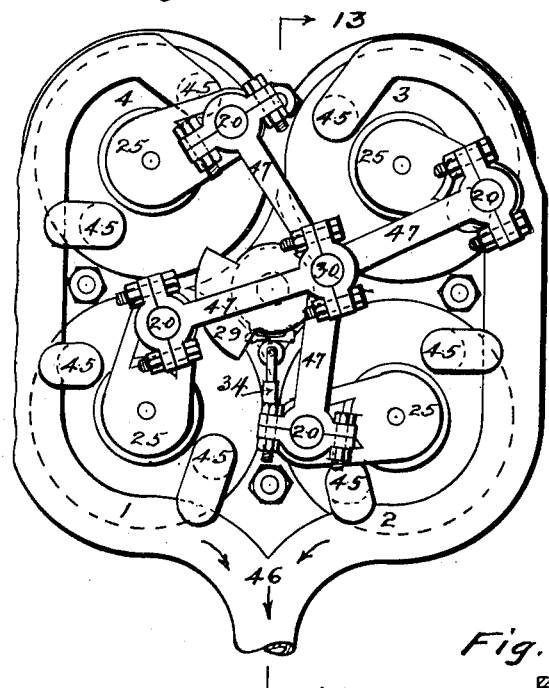
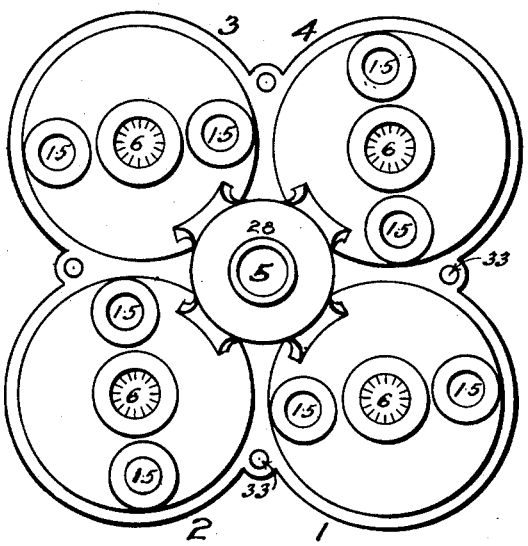
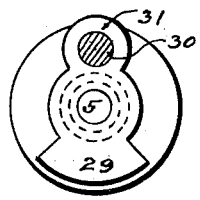
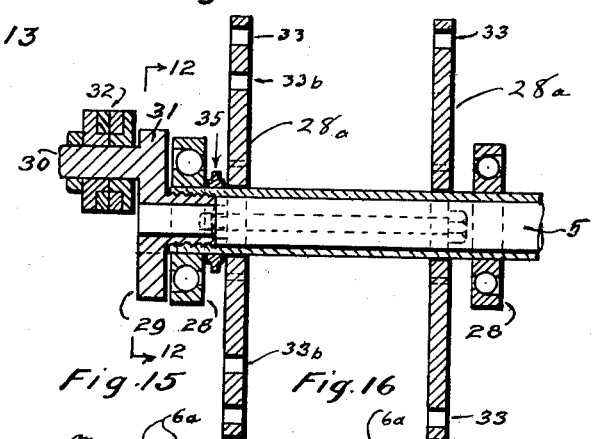
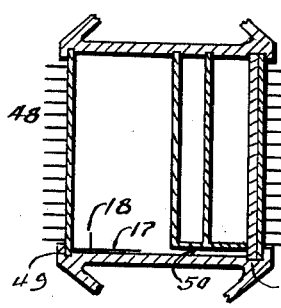
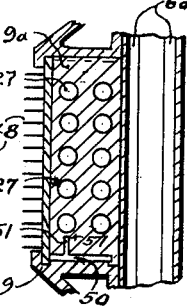
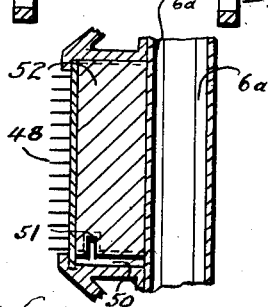

Patented Apr. 17, 1934

1,955,148

UNITED STATES PATENT OFFICE 1,955,148

ENGINE WITH AN OSCILLATING BLADE OR BLADES FOR THE DEVELOPMENT OF POWER

William H. Robertson and John H. Lewis, Portland, Oreg.

Application June 21, 1929, Serial No. 372,784

4 Claims. (Cl. 123—18)

The invention resides primarily in the oppositely opposed firing and compression chambers in which the blades oscillate, which arrangement prevents unequal distortion in each casing and balances pressures at all times on the hollow shaft to which the blades are attached, thus removing one of the primary causes of failure of this type of engine in the past; also in the internal cooling arrangement which makes possible two cycle operation; the plurality of casings with driving shaft in each connected with a common driven shaft which makes possible the concentration of great power on such driven shaft; the firing of each casing chambers in proper sequence around such common driven shaft so as to permit overlapping of firing impulses; the compactness and simplicity of construction; the small number of moving parts; the absence of heavy reciprocating parts for the comparatively large displacement of firing chambers; the absence of heavy piston side slap as found in the ordinary cylinder type engines; the high speed which will be possible in large size units, because of the absence of such heavy reciprocating parts; the turbulence of compressed charge at time of fuel injection; the adaptability of such two cycle internal combustion engine for using therein any liquid, vapor or gas as a power producing medium, and other features, all as herein described and claimed.

The preferred type of engine, having semicircular blades to avoid the difficulty of packing square corners to make gas tight chambers, but shown herein as square for convenience of illustration.

In the accompanying drawings, only one of many possible forms or combinations of the invention is shown whereby power may be generated and transmitted through the medium of a two cycle, oscillating blade, internal combustion engine.

Description of figures

In said drawings, Fig. 1 is a diagrammatic side view of our engine.

Fig. 2 is a transverse section taken on the line 2—2 in Fig. 1.

Fig. 2a is a transverse section through cylinder 3 of Fig. 2 showing the location of plane 19—19 from which such cylinder is viewed in Fig. 19.

Fig. 3 is a front end view of one of our casings.

Fig. 4 is a longitudinal section taken on a line through such casing marked 4—4 in Fig. 3 and also similarly marked in casing 1 of Fig. 2.

Fig. 5 is a transverse section through such casing taken on a line marked 5—5 in Fig. 4.

Fig. 6 is a top view looking down on the blade and shaft only, as shown 6—6 in Fig. 5 immediately above.

Fig. 7 is a longitudinal section through the casing, taken on a line 7—7 as shown in casing 1, of Fig. 2.

Fig. 8 is a longitudinal section taken on a line through such casing marked 8—8 in casing 1, of Fig. 2.

Fig. 9 is a longitudinal section through a similar casing on an angular line marked 9—9 in casing 3 of Fig. 2.

Fig. 10 is a partial back view of our engine showing connecting rods, exhaust pipes, etc.

Fig. 11 is a diagrammatic front view of our engine showing air intake funnels to the hollow oscillating shafts and intake valves, also the front bearing to support the driven shaft 5.

Fig. 12 is an end view of the crank pin, arm and counterbalancing weight of the driven shaft 5 taken on the line 12—12 in Fig. 13.

Fig. 13 is a diagrammatical longitudinal section through such driven shaft showing end plate walls, taken on a line 13—13 in Fig. 10.

Fig. 14 is a longitudinal section, in part, through one of our casings, taken on a line 14—14 in Fig. 5.

Fig. 15 is a half longitudinal section in part through one of our casings taken on a line marked 15—15 in Fig. 5.

Fig. 16 is a half longitudinal section in part, taken on a line marked 16—16 in Fig. 5.

Fig. 17 is a diagrammatic section of a back view of our engine taken approximately on a line marked 17—17 in Fig. 1.

Fig. 18 is a section through one of the pumps and supporting end walls as shown 34 on Fig. 17.

Fig. 19 is a diagrammatic view of cylinder 3 as viewed from plane 19—19 in Fig. 2a, and shows a portion of the casing of such cylinder removed to indicate how the air which has been compressed in auxiliary chamber 9, by the blade 7 receding after firing to its full extent, is transferred from such chamber 9 to the firing chamber 8 after first automatically opening the exhaust port 16 and an instant later the intake port 15, the intake valve being automatically closed, thus completing the passageway from chamber 9 to 8 around the blade.

The form of our device as shown, consists of four casings 1, 2, 3, and 4, Fig. 2, all similar in construction and operation, having a common driven shaft 5 suitably connected to shaft 6 of each casing as later described. Each of said casings is provided with oppositely opposed hollow blades 7 mounted on the hollow shaft 6 with suitable cooling fins 6a for the internal cooling of said blades and hollow shaft which oscillates in said chambers. 8 in Fig. 8 is the offset firing chamber. As the oscillating blade 7 is driven forward to its extreme limit as shown in Fig. 9, we have there shown the maximum limit of such firing chamber 8. As such blade 7 Fig. 9 returns on its high compression stroke, 7a represents that part of chamber 8 behind such blade adjacent to chamber 9 and connected therewith by holes 27 as shown in Fig. 7. Chamber 9 is an auxiliary chamber in which fresh air is compressed to such limited extent as necessary to quickly force its way through the by-pass in which valve 15 operates, so as to scavenge the exhaust gasses in firing chamber 8 and force them out the exhaust port 16. Chamber 10 is formed by the two solid plates 8a and 10b connected with the outer casing and to the cross plate holding packing bars 11, which solid plates fit snugly into the end plates to such chambers, thus forming fixed abutments limiting the volume in firing chamber 8 and auxiliary chamber 9, which chambers 8 and 9 are proportioned in volume so as to cause such high and low compression of the contained air in the respective chambers as to provide two cycle internal combustion operation of the engine with automatic firing upon injection of the fuel through heat generated by high compression of the air preliminary to firing. A fuel valve and fuel injection nozzle is represented diagrammatically by 10a and is placed in chamber 10 and suitably connected with fuel pumps 34 as shown in Fig. 17 and Fig. 18. The packing bars 11, Fig. 2, in such fixed abutments effectively seal the oppositely opposed chambers. The circular packing rings 11 in Fig. 4, seal such chambers at either end of the hollow shaft 6. Suitable packing 12 in Fig. 2, is provided for the outer edge and 13 the same for both ends of blades 7 to make a tight seal at all times during oscillation of the blades. A suitable lip 14 is attached to each blade 7 on the firing chamber side thereof, to direct the fresh air at approximately right angles as it enters from auxiliary chamber 9, (Fig. 9) thus creating a swirling motion in the intake end of 8 so as to keep the fresh air in a solid body while driving the exhaust gas out at the exhaust port 16, all as clearly shown in Fig. 9. The automatic intake valve 15, Fig. 7, is at the front end of the casing and is funnel shaped to facilitate air entrance to chamber 7a and 9, Fig. 7. The exhaust port 16, is automatically opened by the receding blade 7, slightly in advance of a like opening of the intake port at the opposite end of chamber 8. As blade 7 advances on its compression stroke, plate 17 attached thereto, automatically closes exhaust port 16 (Fig. 7) to create such vacuum as necessary to open intake valve 15. Means for holding 17 in place is shown at 18 in Fig. 14 and Fig. 6. 19 in Fig. 4, shows suitable bearings for the oscillating shaft 6. Crank pin 20 is shown (Fig. 3) as means for transmitting power from the crank arm 25 attached to the hollow shaft 6. 21 in Fig. 5, shows a means for strengthening blades 7 where connected to the hollow shaft 6, without preventing the flow of air through such shaft to a deflector 22 which causes the air to flow through suitable openings into each of blades 7, such air returning through similar openings into 6, before passing out at the rear. 23 in Fig. 4 is a means for retaining a cooling liquid adjacent to the bearing 19. 24 shows a means for admitting a cooling liquid to and from 23. 25 is the crank arm with hollow extension for connection to hollow shaft 6. 26 is means for cooling bearings 19. 27 in Fig. 7 and Fig. 15, shows openings in partitions between chambers 7a and 9. 28 in Fig. 1, also Figs. 11 and 13, shows suitable bearings attached to the end plates 28a to support the driven shaft 5, the driving shafts 6 projecting through such end plates. 29 in Fig. 1, and Fig. 12, shows a means for counterbalancing the crank pin 30 and connections thereto. The crank arm to shaft 5 is shown 31, Fig. 12 and Fig. 13. 32 in Fig. 13, shows a means for connecting the driving shafts 6 with the crank arm of the driven shaft 5. 33 in Fig. 13 shows suitable openings in the end plates through which the bolts 33a (Fig. 1) pass to tie the end plates to the casings 1, 2, 3 and 4. 33b in Fig. 13 shows openings in rear end plates 28a through which the stem 42 of the fuel pump 34 (Fig. 18) passes and means for fastening same in place. 35 is a suitable cam (Figs. 13 and 17) attached to the driven shaft 5, which cam has a knob 35a (Fig. 17) attached, which knob actuates suitable mechanism to operate the fuel pumps 34. 36 in Fig. 17 is a rocker arm suitably attached to the rear end plate 28a which governs the length of stroke and amount of fuel injected by the pump, depending upon the point of contact of the movable pump piston therewith. 37 in Fig. 18, is the plunger of the pump actuated by the open pump guides 37a in which the contact wheel 37b is fastened. 38 is the fuel intake line to the shaft of such oscillating pump and 39 the discharge line leading to the fuel injection valve 10a (Fig. 9). Such pump shaft contains suitable valve mechanism 40 and 41, adjacent to the common chamber 42a. Handle 43 attached to such pumps 34 is provided with suitable connecting device 44, movement of which acts as a throttle to control the speed of the engine. 45 in Fig. 10, shows rear view of the exhaust ports with suitable connections to common exhaust pipe 46. In the same view 47 shows connecting rods between crank pins 20 of the crank arms 25 and crank pin 30 of the driven shaft 5. Suitable cooling fins for the outside of casings 1, 2, 3 and 4, are shown 48 in Fig. 2. Recesses in end plates 28a are provided 49, Fig. 14 and Fig. 15, for the casings to enter, also for the fixed abutment walls, which create interior chambers. Suitable opening 50 is provided for plate 17 to enter, also suitable opening 51 Figs. 15 and 16, is provided for brace 18 for such plate to enter. Partition walls 52, Fig. 16, between chambers 9 and 10 is solid with the exception of openings 50 and 51, and is suitably connected to the casings to make tight chambers.

The operation of our engine is as follows:

As compression and firing takes place simultaneously in the oppositely opposed chambers of each casing, the power for the compression stroke in any casing must come from one or more of the other casings where the firing stroke is under way during this compression period and all of which casings have their driving shafts (four in this case) connected to a common driven shaft. As the two oppositely opposed blades in one of the casings are thus being driven forward on such compression stroke by the power from other blades, in other casings connected to such common driven shaft, where the firing is so timed as to give overlapping firing impulses, fresh air is automatically drawn in through the automatic intake valve (Figs. 7 and 9) behind each of such advancing blades, filling also the auxiliary compression chamber connected therewith. During this operation, a plate attached to the exhaust end of each blade on the side opposite the firing chamber, automatically closes the exhaust port, thus causing a sufficient vacuum behind such advancing blades as to operate the automatic air intake valve. During this air intake operation, fresh air from a previous intake operation is being compressed in the firing chamber on the opposite side of each blade to the degree necessary to cause firing when the fuel is injected. Fuel is then forced into such compressed air by proper pump and fuel injection nozzle as to automatically cause firing. The excess pressure on firing causes the blades to be forced back, automatically closing the air intake valves and causing the fresh air on the opposite side of the blades from the firing chamber, to be slightly compressed in the auxiliary compression chamber to the extent only as may be necessary to force it through the by-pass around the end of the blade after the intake port is automatically opened. This intake port however does not open until after the exhaust port has first been opened for a sufficient length of time to relieve the exhaust gases of all excess pressure. During this by-pass operation the automatic intake air valve is kept closed by the pressure of the low compression air in such auxiliary chamber. After such intake port begins to open, the blade continues to recede into such auxiliary chamber until such intake port is fully open, thus assisting in forcing additional air around through the by-pass into the compression chamber. A lip attached to each blade just below the intake port, causes this air to be deflected approximately at right angles, with a swirling motion in this end of the firing chamber, thus keeping the fresh air in a solid body, as it fills the chamber, forcing the exhaust gases before it, and out the exhaust port at the other end of the chamber in this scavenger operation. The chamber thus being filled with fresh air is ready for its return compression stroke of the blades. The offset compression chamber is placed at one end of the firing chamber, so that the blade as it reaches the extreme end of its compression stroke forces air from one end to the offset firing chamber causing great turbulence during the firing operation. The size of the intake and exhaust ports will be governed by the speed of the engine. High speed will be attainable because of the absence of heavy reciprocating parts. The only contact between the oscillating blades and encircling casing is light packing bars. Where two blades diametrically opposed are used, with the same firing and compression pressures being simultaneously developed in diametrically opposed similar chambers, the internal pressures are balanced on the blades and driving shaft, thus facilitating high speed operations and lessening distortion of the casings.

We claim:—

1. In an engine of the character described, a casing provided with a chamber, a shaft mounted in the same, a blade attached to said shaft oscillating in said chamber, intake and exhaust ports to said chamber, suitable valve mechanism for the intake port and piston controlled valve for the exhaust port, auxiliary chamber provided in said chamber, suitably connected to the chamber at the opposite side of the blade, firing means and means for transmitting power from said shaft.

2. In an engine of the character described, a casing provided with a chamber, a shaft suitably mounted in the same, a blade attached to said shaft oscillating in said chamber, intake and exhaust ports to said chamber, suitable valve mechanism for the intake port and piston controlled valve for the exhaust port, auxiliary compression chamber provided in said chamber, suitably connected with the compression chamber at the opposite side of the blade, means for deflecting the air from said auxiliary chamber as it enters the compression chamber from the auxiliary chamber at the opposite side of the blade, firing means and means for transmitting power from said shaft.

3. In an engine of the character described, a casing provided with a pair of oppositely opposed chambers, a shaft mounted in said casing axially aligned with said oppositely opposed chambers, oppositely opposed blades attached to said shaft oscillating in said chambers, intake and exhaust ports to said chambers, suitable valve mechanism for each of said intake ports and piston controlled valve for each of said exhaust ports, oppositely opposed auxiliary chamber provided in each of said chambers, suitably connected with the chamber at the opposite side of each of said blades, firing means and means for transmitting power from said shaft.

4. In an engine of the character described, a casing provided with a pair of oppositely opposed chambers, a shaft mounted in said casing axially aligned with said oppositely opposed chambers, oppositely opposed blades attached to said shaft oscillating in said chambers, intake and exhaust ports to each of said chambers, suitable valve mechanism for each of said intake ports and piston controlled valve for each of said exhaust ports, oppositely opposed auxiliary chamber provided in each of said chambers suitably connected with the chamber at the opposite side of each of said blades, means for deflecting the air from each of said auxiliary chambers as it enters each of the compression chambers from the auxiliary chambers at the opposite side of each blade, firing means and means for transmitting power from said shaft.

WILLIAM H. ROBERTSON.
JOHN H. LEWIS.